United States Patent
Stewart et al.

(10) Patent No.: US 7,069,202 B2
(45) Date of Patent: Jun. 27, 2006

(54) SYSTEM AND METHOD FOR VIRTUAL INTERACTIVE DESIGN AND EVALUATION AND MANIPULATION OF VEHICLE MECHANISMS

(75) Inventors: Paul Joseph Stewart, Ann Arbor, MI (US); Aaron West, Torrance, CA (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 754 days.

(21) Appl. No.: 10/042,918

(22) Filed: Jan. 11, 2002

(65) Prior Publication Data

US 2003/0132968 A1    Jul. 17, 2003

(51) Int. Cl.
    *G06G 7/48*    (2006.01)
(52) U.S. Cl. ............................................. 703/7; 434/69
(58) Field of Classification Search .................... 703/2; 706/905, 913; 434/69, 61; 702/7
    See application file for complete search history.

(56) References Cited

U.S. PATENT DOCUMENTS

| | | | |
|---|---|---|---|
| 4,821,214 A | 4/1989 | Sederberg | |
| 5,119,309 A | 6/1992 | Cavendish et al. | |
| 5,179,644 A | 1/1993 | Chiyokura et al. | |
| 5,184,956 A * | 2/1993 | Langlais et al. | 434/69 |
| 5,253,331 A | 10/1993 | Lorenzen et al. | |
| 5,277,584 A * | 1/1994 | DeGroat et al. | 434/29 |
| 5,459,382 A | 10/1995 | Jacobus et al. | |
| 5,504,845 A | 4/1996 | Vecchione | |
| 5,583,526 A | 12/1996 | Socks et al. | |
| 5,631,861 A | 5/1997 | Kramer | |
| 5,731,816 A | 3/1998 | Stewart et al. | |
| 5,748,943 A | 5/1998 | Kaepp et al. | |
| 5,792,031 A | 8/1998 | Alton | |
| 5,793,382 A | 8/1998 | Yerazunis et al. | |
| 5,831,584 A | 11/1998 | Socks et al. | |
| 5,846,086 A | 12/1998 | Bizzi et al. | |
| 5,903,458 A | 5/1999 | Stewart et al. | |
| 5,921,780 A | 7/1999 | Myers | |
| 5,930,155 A | 7/1999 | Tohi et al. | |
| 5,963,891 A | 10/1999 | Walker et al. | |
| 5,999,187 A | 12/1999 | Dehmlow et al. | |
| 6,036,345 A | 3/2000 | Jannette et al. | |
| 6,037,945 A | 3/2000 | Loveland | |
| 6,084,590 A | 7/2000 | Robotham et al. | |
| 6,104,158 A | 8/2000 | Jacobus et al. | |
| 6,146,143 A * | 11/2000 | Huston et al. | 434/69 |
| 6,198,979 B1 | 3/2001 | Konno | |
| 6,253,167 B1 | 6/2001 | Matsuda et al. | |
| 6,262,738 B1 | 7/2001 | Gibson et al. | |

(Continued)

OTHER PUBLICATIONS

Lafon, "Solid Modeling With Constraints and Parameterised Features", IEEE, Jul. 1998.

(Continued)

*Primary Examiner*—Albert W. Paladini
(74) *Attorney, Agent, or Firm*—David B. Kelley; Bliss McGlynn

(57) ABSTRACT

A system and method for virtual interactive design and evaluation and manipulation of a vehicle mechanism using a haptic-user interface is provided. The system includes a computer system and a haptic interface operatively in communication with the computer system, whereby the haptic interface includes a haptic end effector device for transmitting information between a user and a digital model as the user interactively creates, modifies, and evaluates kinematic and dynamic properties of the vehicle mechanism using the haptic end effector device.

18 Claims, 6 Drawing Sheets

U.S. PATENT DOCUMENTS

| | | | |
|---|---|---|---|
| 6,273,724 | B1 | 8/2001 | Roytman |
| 6,636,161 | B1 * | 10/2003 | Rosenberg ................... 341/20 |
| 6,712,175 | B1 * | 3/2004 | Kind et al. ................. 180/402 |
| 2002/0000996 | A1 | 1/2002 | Trika |
| 2002/0133264 | A1 | 9/2002 | Maiteh et al. |
| 2002/0140633 | A1 | 10/2002 | Rafii et al. |
| 2002/0163497 | A1 | 11/2002 | Cunningham et al. |
| 2003/0134676 | A1 | 7/2003 | Kang |

OTHER PUBLICATIONS

Jinsong et al., "Parametric Design with Intelligence Configuration Analysis Mechanism", IEEE, Nov. 1993.

Mateos et al., "Parametric and Associative Design of Cartridges for Special Tools", IEEE 1995.

Artificial Intelligence (Understanding Computers), by Time-Life Books, 1986, ISBN 0-8094-5675-3, pp. 36-43.

Juran on Quality by Design, by J.M. Juran, The Free Press, 1992, ISBN 0-02-916683-7, pp. 406-427, and 462-467.

The Computer Science and Engineering Handbook, by Allen B. Tucker, CRC Press, ISBN: 0-8493-2909-4, 1996, p. 1954.

Smid et al., "Human Integration in Simulation" IEEE 1998 pp. 554-558.

Narinder Nayar, DENEB/ERGO—A Simulation-Based Human Factors Tool, 1995, Proceedings of the Winter Simulation Conference, pp. 427-431.

Deidre L. Donald, A Tutorial on Ergonomic and Process Modeling Using Quest and IGRIP, 1998, Proceedings of the 1998 Winter Simulation Conference, pp. 297-302.

Purschke-F et al. :Viurtual Reality-New Methods for Improving and Accelerating the Development Process in Vehicle Styling and Design IEEE document via Computer Graphics International Jun. 1998, p. 1-11.

Duane et al., "DOE/Opt: A System for Design of Experiments, Response Surface Modeling and Optimization Using Process and Device Simulation" 1993. p. 1-4.

Chen et al., "A Real-Time, Interactive Method for Fast Modification of Large-Scale CAE mesh Models" 2000. p. 1-8.

Chen et al. IMF 1.0 User Manual Project No. AJ499 Ford Research Laboratory Oct. 26, 1999. p. 1-14.

Woodward, Charles D.; "Cross-Sectional Design of B-Spline Surfaces," 1987, Computers and Graphics, vol. 11, No. 2, pp. 193-201.

Piegl, Les; "On NURBS: A Survey", IEEE Computer Graphics and Applications, vol. 11, Issue 1, Jan. 1991, pp. 55-71.

Piegl, Les; Tiller, Wayne; The NURBS Book, Second Edition, 1997, Springer, pp. 333-359, 419-441, 455-514.

* cited by examiner

SYSTEM AND METHOD FOR VIRTUAL INTERACTIVE DESIGN AND EVALUATION AND MANIPULATION OF VEHICLE MECHANISMS

BACKGROUND OF THE INVENTION

1. Field of the Invention

The present invention relates generally to vehicles and, more specifically, to a system and method for virtual interactive design and evaluation and manipulation of vehicle mechanisms of a vehicle.

2. Description of the Related Art

Vehicle design, and in particular the design of an automotive vehicle, has advanced to a state in which computer-assisted design techniques are frequently incorporated in the development of a new vehicle or redesign of an existing vehicle. Enhanced visualization software tools allow for interactive display and manipulation of large geometric digital models, including digital models developed using computer-assisted design (CAD). In the field of vehicle design, the use of computer-assisted design and visualization techniques are especially beneficial in designing, packaging, and assembling various systems incorporated within the vehicle to maximize the design and functional capabilities of these vehicles. Advantageously, potential vehicle system designs can be considered in a timely and cost-effective manner by analyzing a digital representation of a proposed design versus preparing an actual physical model.

One aspect of the design task for a vehicle is the coexistence of a digital model and a physical model. An advantage of the physical model is that it provides a vehicle representation of the design that can be evaluated visually and by touch.

Recently, designers have utilized virtual reality simulation techniques to provide a bridge between the physical model and the digital model. Virtual reality allows a user to interact with a virtual environment, including a virtual object in the virtual environment, as if the user was actually immersed in the virtual environment.

A user-friendly vehicle device, such as a haptic device, serves as an interface between the user and the virtual environment. An example of a haptic device is disclosed in U.S. Pat. No. 5,694,013 to Stewart et al., entitled "Force Feedback Haptic Interface for a Three-Dimensional CAD Surface", the disclosure of which is incorporated by reference.

Previous virtual reality interfaces suffer from two major disadvantages. The first disadvantage is the poor quality of graphic rendering, in terms of resolution, refresh, and fidelity. The second disadvantage is the user interface during exploration and manipulation of the digital model. As a result, it is desirable to provide a system for virtual prototyping vehicle mechanisms and allow designers to interactively create, modify, and evaluate kinematic and dynamic properties of moving parts of a vehicle. It is also desirable to provide the system with a novel user-interface for three-dimensional virtual applications. Thus, there is a need in the art for a system and method to design and evaluate vehicle mechanisms.

SUMMARY OF THE INVENTION

Accordingly, the present invention is a system for virtual interactive design and evaluation and manipulation of vehicle mechanisms using a haptic-user interface. The system includes a computer system having a memory, a processor, a user input device and a display device and a computer generated digital model of a vehicle mechanism stored in the memory of the computer system. The system further includes a haptic-user interface operatively in communication with the computer system. The haptic-user interface includes a haptic end effector device for transmitting force and tactile information between a user and the digital model. The user interactively creates, modifies, and evaluates kinematic and dynamic properties of the vehicle mechanism using the haptic end effector device.

In addition, the present invention is a method for virtual interactive design and evaluation and manipulation of vehicle mechanisms using a haptic-user interface including the steps of importing a digital model of a vehicle mechanism for evaluation using a haptic end effector device operatively connected to a haptic-user interface. The method also includes the steps of determining whether a user is signaling a mode change for the digital model and determining the mode change if the user is signaling a mode change of the digital model. The method includes the steps of getting a position of the haptic end effector device into a coordinate reference frame for the digital model if the user is not signaling a mode change of the digital model. The method further includes the steps of determining whether a control handle on the digital model is close enough to the haptic end effector device and executing the mode change if the control handle is close enough. The method includes the steps of applying an attraction force to the control handle if the control handle is close enough. The method also includes the steps of terminating the session if the user desires.

One advantage of the present invention is that a system and method for virtual interactive evaluation and manipulation of a digital model of vehicle mechanisms using a haptic-user interface is provided. Another advantage of the present invention is that the system and method is a computer-user interface for three-dimensional input devices for virtual interactive evaluation and manipulation of a digital model of vehicle mechanisms. Yet another advantage of the present invention is that the system and method allows for virtual interactive evaluation and manipulation of a digital model of vehicle mechanisms. Still another advantage of the present invention is that the system and method allows designers to interactively create, modify or edit, and evaluate kinematic and dynamic properties of moving parts inside of a vehicle such as gear-sticks, steering wheels, seats, doors, glove compartments, and sun-visors with a haptic-user interface for three-dimensional virtual applications. A further advantage of the present invention is that the system and method employs Control-Handles and Spherical-Buttons as an effective interface between the user and the digital model. Yet a further advantage of the present invention is that the system and method provides a more natural and effective interaction with three-dimensional data. Still a further advantage of the present invention is that the system and method is faster, less expensive, and more flexible than a physical model.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 2 is a diagrammatic view of the system of interactive evaluation and manipulation of a digital model of FIG. 1.

DESCRIPTION OF THE PREFERRED EMBODIMENT(S)

Figure 1:
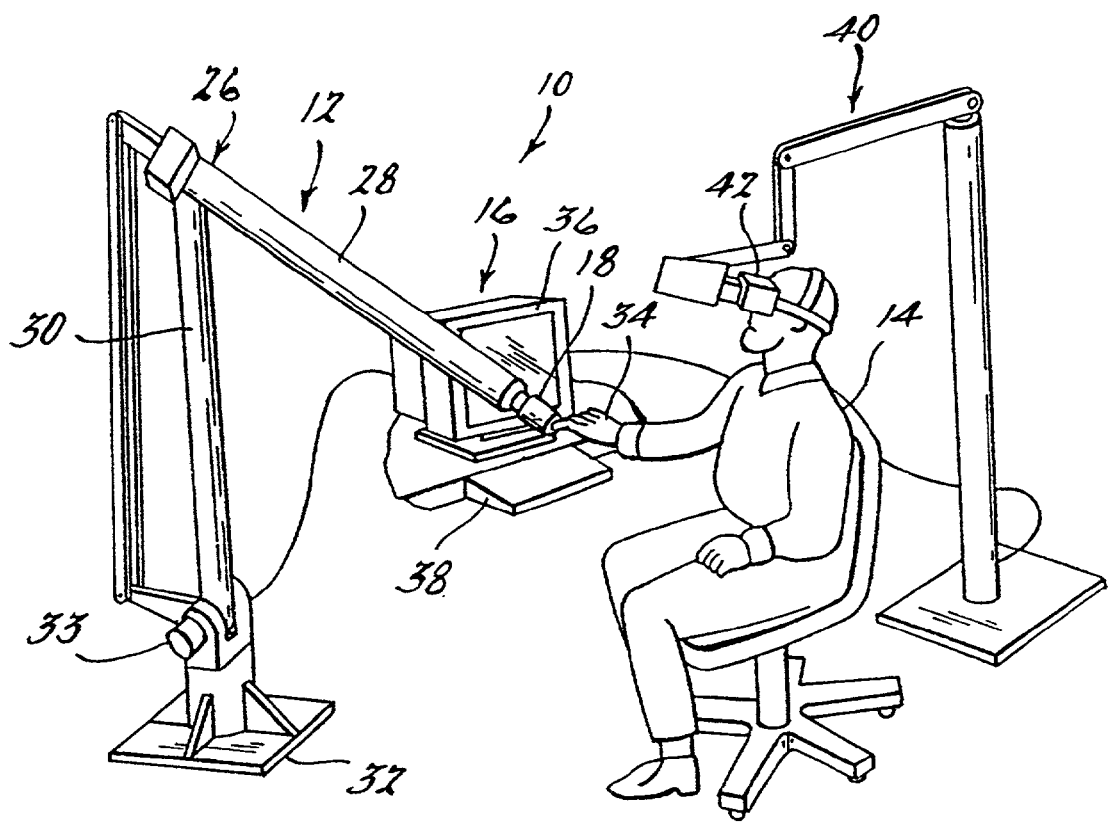
FIG. 1 is a perspective view of a system of interactive evaluation and manipulation of a digital model of vehicle mechanisms, according to the present invention.
Figure 3:
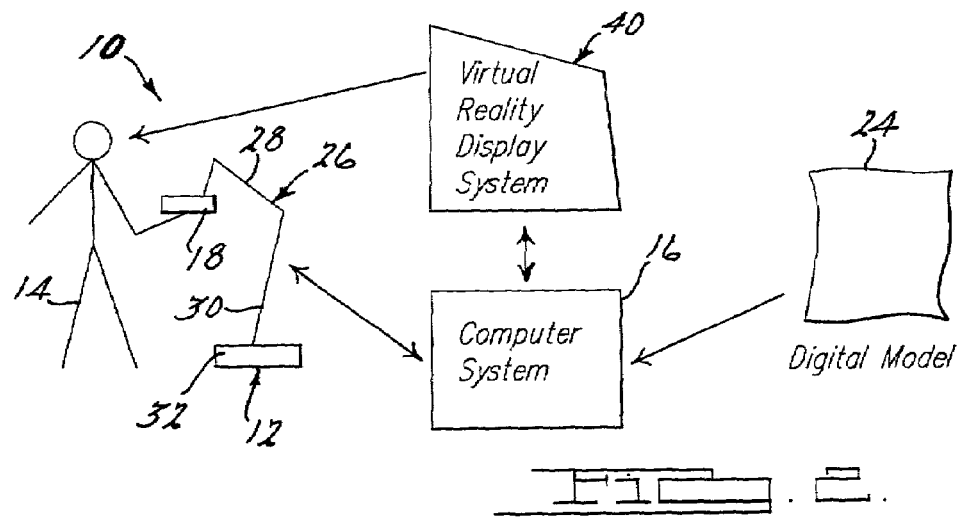
FIGS. 3A through 3D are flowcharts of a method for virtual interactive evaluation and manipulation of vehicle mechanisms using a haptic-user interface, according to the present invention, using the system of FIG. 1.

Referring to the drawings and in particular to FIGS. 1 and 2, one embodiment of a system 10, according to the present invention, for virtual interactive evaluation of vehicle mechanisms using a haptic-user interface 12 is illustrated graphically. The system 10 includes a haptic-user interface 12 operated by a user 14 that controls position, orientation, and force feedback between the user 14, a computer system 16, and a virtual object such as the vehicle mechanism.

The haptic-user interface 12 includes a haptic end effector device 18, such as a stylus, pen, or any other similar gripping device. The user 14 grasps the haptic end effector device 18.

The haptic-user interface 12 also includes a hingeable arm 26. In one embodiment, the hingeable arm 26 includes an upper arm 28 and a lower arm 30. The haptic end effector device 18 is attached to the upper arm 28. The lower arm 30 is attached to a base 32. The haptic-user interface 12 is operatively connected to an actuating device 33, such as a servo I/O interface, or other similar device capable of transmitting forces to the haptic end effector device 18 through the arms 28,30 in at least three degrees of freedom. Information regarding an interaction with the virtual object is transmitted through the haptic end effector device 18 and the hingeable arm 26 to the computer system 16. It should be appreciated that the haptic-user interface 12 provides an interface between a real world and a virtual world.

The system 10 further includes the computer system 16, as is known in the art, operatively connected to the haptic-user interface 12. The computer system 16 includes a processor, a controller, and a memory to process information relevant to the method, according to the present invention, for virtual interactive evaluation and manipulation of vehicle mechanisms. The computer system 16 includes a display device 36, such as a video terminal, to display the computer-assisted vehicle design.

The user 14 inputs information into the computer system 16 when prompted to do so. Selection and control of the information within a screen can be achieved by the user 14 via a user interactive device 38 such as a keyboard. The set of parameters or the set of instructions may be specific to the method for virtual interactive evaluation and manipulation of the vehicle mechanisms, wherein other data and information non-specific to the method may already be stored in the memory of the computer system 16. One example of an input method is a pop-up dialog box containing available information or instructions. For example, information may be representative of different vehicle design alternatives. The computer system 16 utilizes the set of information or instructions from the user 14 and any other information in carrying out the method, according to the present invention and discussed in detail subsequently, for virtual interactive evaluation and manipulation of a digital model 24 of the virtual object such as a vehicle mechanism.

The system 10 also includes a virtual reality display system 40. The virtual reality display system 40 includes a head mounted display device 42 as is known in the art. The virtual reality display device 42 is worn by the user 14 and allows the user 14 to "see" a virtual environment. The virtual reality display system 40 is in communication with the computer system 16 and provides the user 14 a view through a virtual human's eyes or a first person view of the virtual environment. For example, the position of the haptic end effector device 18 is measured, mapped into a reference frame of the digital model, and visually rendered on either the display device 36, the head mounted display device 42, or another type of graphical display device (not shown) as is known in the art. It should be appreciated that the system 10 can be utilized to evaluate a vehicle mechanism based on various factors, such as assembly verification and ergonomics.

In operation, a controller sends the computer system 16 a signal representing a joint position for the joints between the haptic end effector device 18, upper arm 28, lower arm 30, and base 32, respectively. The computer system 16 sends force signals to the controller, which controls the servo I/O interface 33 to generate the necessary forces applied by the haptic end effector device 18. The user 14 can view the digital model 24, such as on the display device 36 or in the head mounted display device 42.

Referring to FIGS. 3A through 3D, a method, according to the present invention, for virtual interactive evaluation and manipulation of vehicle mechanisms using the haptic-user interface 12 is illustrated. It should be appreciated that a parallel process operating on the computer system 16 may periodically display the digital model 24 and a simplified representation of the haptic end effector device 18 onto the two-dimensional display device 36 or the head mounted display mechanism 42.

Figure 3A:
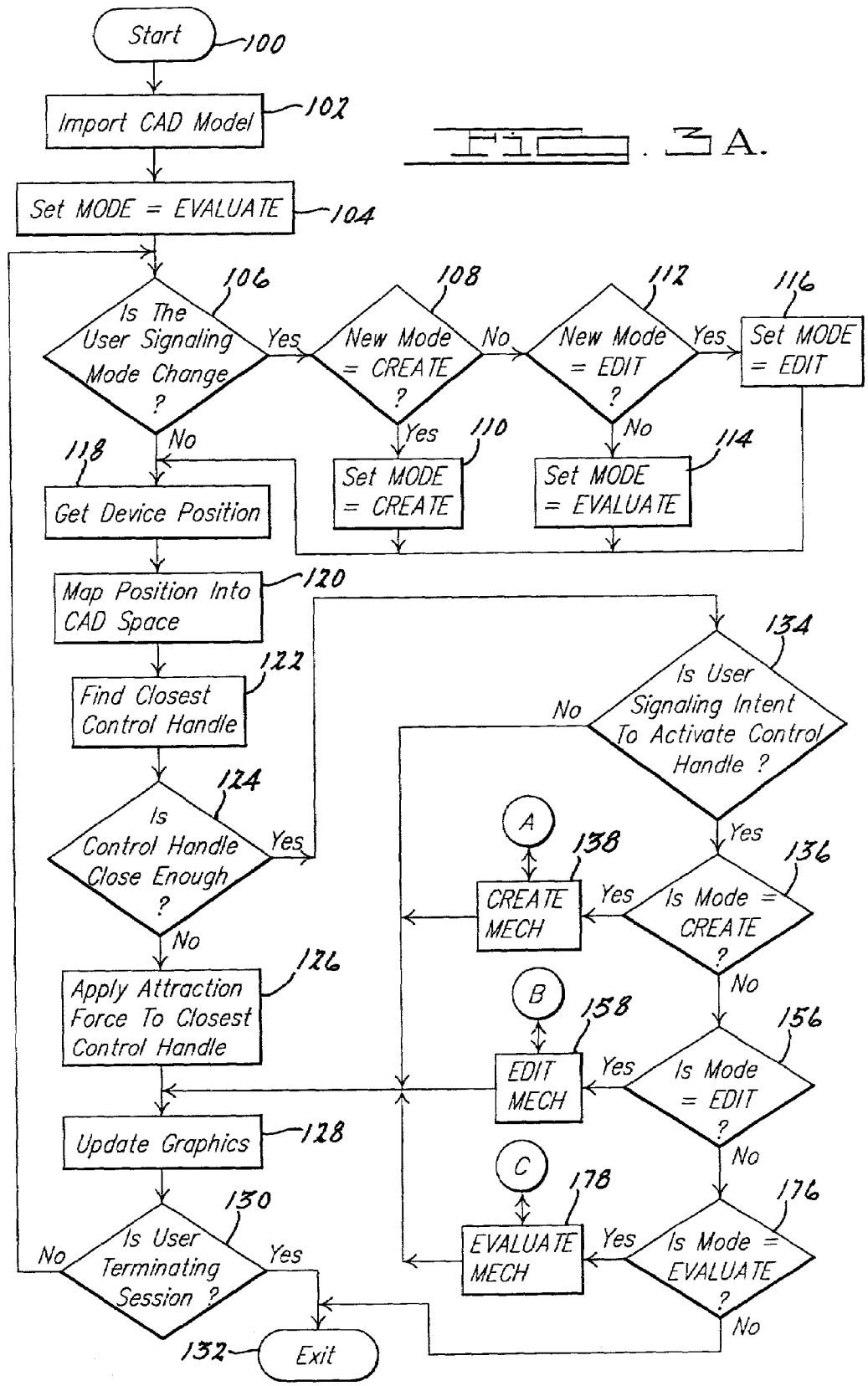

Referring to FIG. 3A, the methodology begins in bubble 100 and continues to block 102. In block 102, the user 14 selects a CAD or tessellated model 24 of a vehicle mechanism (not shown) for interactive evaluation and manipulation and the digital model 24 is imported into the methodology. The user 14 selects the digital model 24 with the computer system 16. Preferably, the digital model 24 is a computer generated digital model and is maintained in a computer database in the computer 16.

From block 102, the methodology advances to block 104 and sets a "mode" equal to "evaluate". The methodology then advances to diamond 106 to be described. It should be appreciated that the methodology can be implemented in an iterative manner.

In diamond 106, the methodology determines whether the user 14 is signaling a mode change. Various types of signals are contemplated, including but not limited to, a switch integral with the haptic end effector device 18, a user interface menu or icon displayed on the display device 36, or pressure on the spherical buttons. If the user 14 is signaling a mode change, the methodology advances to diamond 108 and determines whether the new mode equals "create". If so, the methodology advances to block 110 and sets the mode equal to create. If not, the methodology advances to diamond 112 and determines whether the new mode equals "edit". If not, the methodology advances to block 114 and sets the mode equal to evaluate. If so, the methodology advances to block 116 and sets the mode equal to edit. It should be appreciated that "mechanisms" to be described are used to associate trajectories with a CAD part/assembly in the digital model 24. It should also be appreciated that there are three operating modes: build/create; edit/configure; and play/evaluate.

After blocks 110, 114, and block 116 or if the user 14 is not signaling a mode change in diamond 106, the methodology advances to block 118 and gets the position of the haptic end effector device 18. The methodology determines a haptic end effector device position within a haptic end effector device coordinate system reference frame for use in determining the haptic end effector device position and orientation. Preferably, a workspace reference frame, origin (0,0,0) and scale of the digital model 24 is established, so that the reference frames of the haptic end effector device 18 and digital model 24 are coordinated. Preferably, the haptic end effector device position is established using a tracking technique as is known in the art.

The methodology then advances to block 120 and maps the position of the haptic end effector device 18 into CAD space in the digital model 24 and visualized by the display device 36 or the head mounted display device 42. The method then advances to block 122.

In block 122, the methodology finds a closest "Control-Handle" (CH) on the digital model 24 to the haptic end effector device position, $P_{device}$ Control-Handles are characterized by: a specific action associated with it; a CAD entity such as a CAD part/assembly or a mechanism of the digital model 24; an internal state, active or not active; and/or a geometric shape and color. Control-Handles are the interface to perform action on CAD parts/assemblies of the digital model, such as to modify a mechanism position, orientation, and size. For example, Control-Handles shape and color could be used as a graphical representation of the action associated with it. It should be appreciated that each mechanism has Control-Handles to allow the user 14 to edit and play/evaluate the mechanism. The methodology advances to diamond 124.

Figure 4:
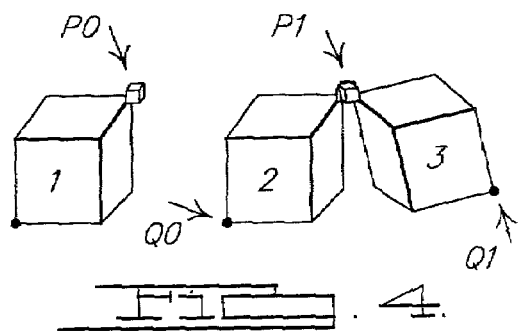
FIG. 4 is a diagrammatic view of a control handle for a mechanism digital model using the system of FIG. 1.

For example, a cube-like Control-Handle is used to apply motion to the white CAD box in FIG. 4. Initially, the white CAD box is located in 1. The user 14 positions the pointing device represented by the arrow in proximity of the Control-Handle represented by P0 and activates it pressing a button on the pointing device, for example the left mouse button on the mouse. Motion on the pointing device is now replicated to the Control-Handle and on the white CAD box as well. After moving to P1, the user 14 releases the button and now the CAD box is in 2. A sphere-like Control-Handle is used to apply rotation to the white CAD box from 2 to 3. It should be appreciated that a cube-like Control-Handle is used to move the white CAD box from 1 to 2 and a sphere-like Control-Handle is used to rotate to the white CAD box from 2 to 3.

Figure 5:
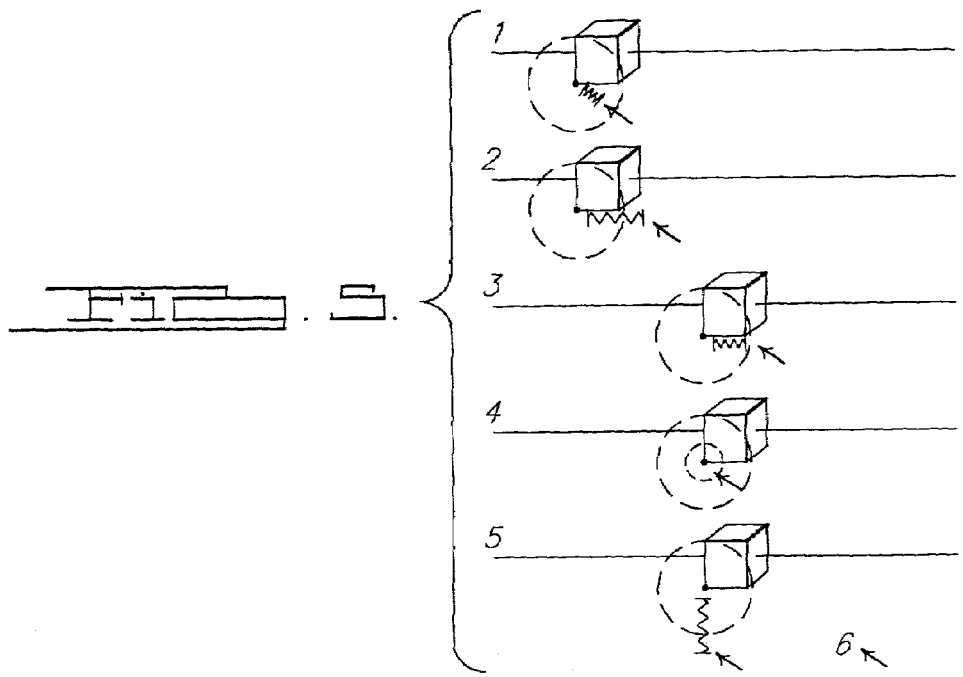
FIG. 5 is diagrammatic views of a control handle for a digital model using the system of FIG. 1.

In another embodiment, a slider is represented in a CAD as a box constrained to move on a line for a rectilinear mechanism. A black, sphere-like Control-Handle is used to apply motion to the slider. If the haptic end effector 18 is used, the force-feedback is applied to pull the hand 34 of the user 14 toward the Control-Handle as illustrated in FIG. 5 as soon as the haptic end effector device 18 is inside a proximity sphere as shown by the dotted line circle. If the user 14 pulls the haptic end effector device 18 outside the proximity circle, force feedback will increase to resist motion. If the haptic end effector device 18 exits the proximity sphere in a direction close to parallel to the slider motion line 2, the Control-Handle will become active and the slider will move. When the user 14 stops moving the haptic end effector device 18, the pointer will get increasingly closer to the Control-Handle, till it enters a smaller proximity sphere 4, and the Control-Handle is now deactivated. To exit the influence area of the Control Handle, the user 14 has to pull the haptic end effector device 18 in a direction orthogonal to the slider motion line 5. When the haptic end effector device 18 is outside the proximity sphere, force feedback is disabled, and the user 14 is free to move to a different Control-Handle 6.

In diamond 124 in FIG. 3A, the methodology determines whether the Control-Handle on the digital model 24 is close enough to the haptic end effector device position, $P_{device}$. When the hand 34 of the user 14 is in the proximity of a Control-Handle, this might change color and shape and the user 14 can click a vehicle button on the display device 36 to virtually grab the Control-Handle. If the Control-Handle is not close enough, the methodology advances to block 126 and applies an attraction force to the haptic end effector device 18. It should be appreciated that, when the hand 34 of the user 14 gets close to a Control-Handle, the Mechanism Simulation Application generates a force field to gently pull the hand 34 of the user 14 toward the Control-Handle. It should also be appreciated that a reference signal is actually sent to the haptic end effector device 18 that will generate a correspondent force feedback. It should be further appreciated that, by pulling away from the Control-Handle, the user 14 can always break free from this force field. It should be appreciated that, while the user 14 is moving Control-Handles to move, rotate, and/or reshape CAD parts/assemblies, force-feedback can be used to attract the Control-Handle to the closest CAD feature, such as the closest NURBS control point, closest vertex, closest surface. It should also be appreciated that if the user 14 positions the Control-Handle sufficiently close to such a feature, and if a Snap-On option is enabled, the CAD part/assembly would be adjusted to snap on the selected feature.

From block 126, the methodology then advances to block 128 and updates the graphics of the digital model 24 on the display device 36 or in the head mounted display device 42. The method advances to diamond 130 and determines whether the user 14 is terminating the session by receiving a signal. Various types of signals are contemplated, including but not limited to, a switch integral with the haptic end effector device 18, a user interface menu or icon displayed on the display device 36, pressure on a spherical button, or orientation of the haptic end effector device 18. If the user 14 is not terminating the session, the methodology advances to diamond 106 previously described. If the user 14 is terminating the session, the methodology advances to bubble 132 and ends or exits the method.

In diamond 124, if the control-handle on the digital mode 24 is close enough to the haptic end effector device position, the methodology advances to diamond 134 and determines whether the user 14 is signaling intent to activate the Control-Handle. If the user 14 is not signaling intent to activate the Control-Handle, the methodology advances to block 128 previously described. If the user 14 is signaling intent to activate the Control-Handle, the methodology advances to diamond 136 and determines whether the mode is equal to create. If so, the methodology advances to block 138 and executes or performs a subroutine called "create mech" by passing through to block 140 in FIG. 3B. It should be appreciated that when the hand 34 of the user 14 is in the proximity of a Control-Handle, this might change color and shape and the user 14 can click a vehicle button the display device 36 to virtually grab the Control-Handle. It should also be appreciated that, in the create mode, a new mechanism is created, shaped, and associated with a CAD part/assembly. It should be further appreciated that, in the create mode, the user 14 associates a mechanism trajectory with a CAD part/assembly of the digital model 24.

Referring to FIG. 4B, in block 140, the methodology gets the position of the haptic end effecter device 18 as previously described. The methodology then advances to block 142 and maps the position into CAD space as previously described. The methodology advances to block 144 and uses the position of the haptic end effector device 18 to move the trajectory of the mechanism relative to the digital model 24.

Figure 6:
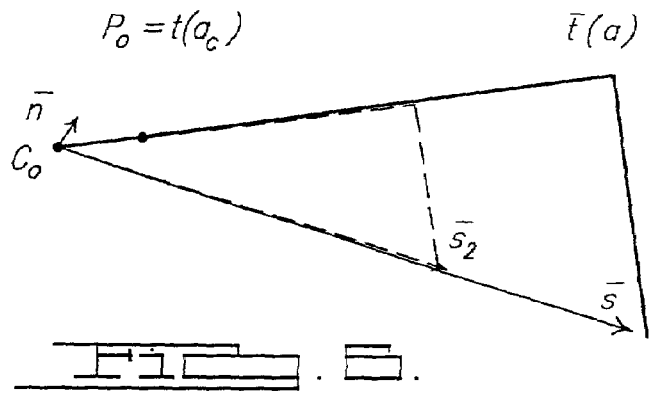
FIG. 6 is a graphical representation of a mechanism using the system of FIG. 1.

In one embodiment, a curvilinear mechanism $M_c$ is defined as a 6-pla as illustrated in FIG. 6 and includes: a reference point $C_0$, relative to the world reference frame; an orientation vector $\bar{n} \in \Re^3$, relative to the world reference frame; scale vector $\bar{s} \in \Re^3$, relative to the world reference frame; a trajectory $t(\alpha)$, relative to the mechanism reference frame; the mechanism handle, alias the current position $P_c$, and its relative parametric $\alpha_c$ that satisfy $t(\alpha_c)=P_c$; an optional dynamics profile, a force f function of the position and velocity of the mechanism handle along the given trajectory:

$$f\left(E(\alpha_c), \frac{\partial E(\alpha_c)}{\partial \alpha_c}\right)$$

A graphical representation of a mechanism is illustrated in FIG. 6.

In one example, m(t), a function of time, is a valid motion of a mechanism M, if for every time t there exist an a so that m(t) t($\alpha$). Motion of vehicle components is achieved by associating a curvilinear mechanism $M_{ci}$ to a CAD part or assembly $A_i$, so that at any given point $P_0=t(\alpha_0)$, the cross product $$\bar{n}_A(\alpha_o) \times \frac{\partial t(\alpha_o)}{\partial \alpha} = \bar{n}_{rel}$$

is known. The current position of the assembly is equal to the current position of the mechanism $P_A=P_C=t(\alpha_C)$. The orientation of the assembly $\bar{n}_A(\alpha_C)$ when its position is $P_A=P_C=t(\alpha_C)$, satisfies the equation:

$$\bar{n}_A(\alpha_c) \times \frac{\partial t(\alpha_c)}{\partial \alpha} = \bar{n}_A(\alpha_o) \times \frac{\partial t(\alpha_o)}{\partial \alpha} = \bar{n}_{rel}$$

Figure 7:
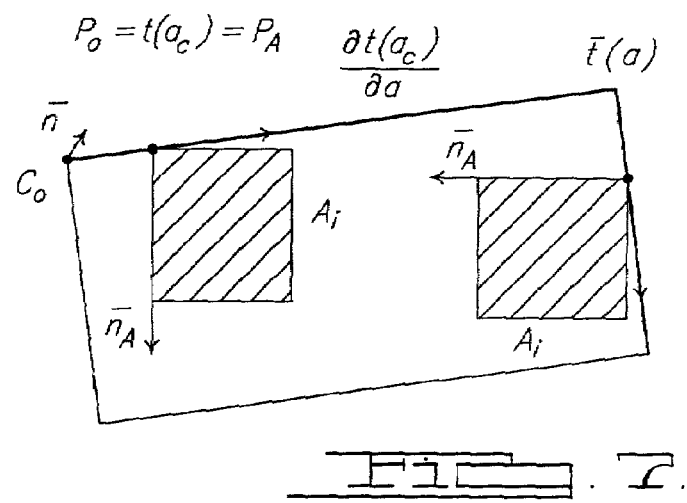
FIG. 7 is a diagrammatic view of a position and orientation of a CAD part/assembly of the digital model constrained by the mechanism trajectory using the system of FIG. 1.

The CAD part/assembly position and orientation are constrained by the mechanism trajectory as illustrated in FIG. 7. Further, the definition of a curvilinear mechanism can be generalized to a surface mechanism $M_s$, if the motion trajectory $t(\alpha)$ is replaced with a motion surface $\vec{S}(u,v)$ and introducing a motion domain $\{u,v\} \in D \subset \Re^2$. A multi-DoF mechanism, if the motion trajectory $t(\alpha)$ is replaced with a motion n-DoF surface $\vec{S}(u_1, u_2, \ldots u_n)$ and introducing a motion domain $\{u_1, u_2, \ldots u_n\} \in D \subset \Re^2$. In most cases, mechanisms of interest have either linear trajectories, such as the front-rear motion of the seat of the vehicle, or circular-elliptical trajectories, such as doors, steering wheel, automatic transmission gear-sticks. For example, the handle of manual transmission gear-sticks describe elliptical circles/arcs on a sphere-ellipsoid.

From block 144 in FIB. 3B, the methodology then advances to block 146 and updates the parameters of the haptic end effecter device 18 as described above. The methodology advances to block 148 and commands force feedback, if needed, as previously described.

From block 148, the methodology advances to block 150 and updates the graphics of the digital model 24 on the display device 36 and the head mounted display device 42 as previously described. The methodology advances to diamond 152 and determines whether the user 14 is signaling end of create. Various types of signals are contemplated, including but not limited to, a switch integral with the haptic end effector device 18, a user interface menu or icon displayed on the display device 36, pressure on a spherical button, or orientation of the haptic end effector device 18. If the user is not signaling end of create, the methodology advances to block 140 previously described. If the user 14 is signaling end of create, the method advances to bubble 154 and returns through block 138 in FIG. 3A to block 128 previously described.

Referring to FIG. 3A, in diamond 136, if the mode is not equal to create, the methodology advances to diamond 156 and determines whether the mode is equal to edit. If the mode is equal to edit, the methodology advances to block 158 and executes or performs a subroutine called "edit mech" by passing through to block 160 in FIG. 3C. It should be appreciated that, when in the edit mode, the user 14 can translate, rotate, shape, and scale the mechanism trajectory and associated CAD assembly.

Figures 3B, 3C:
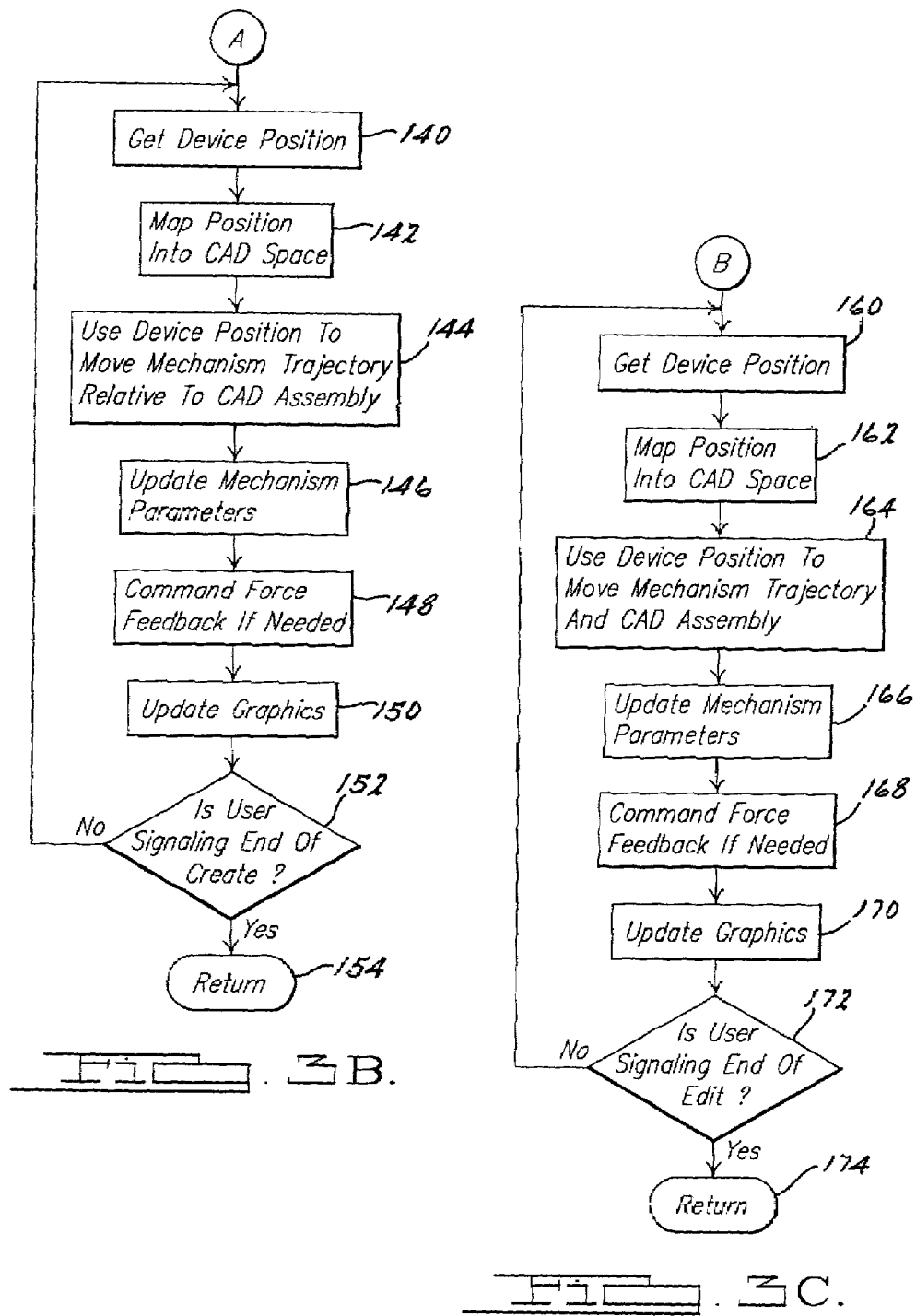

Referring to FIG. 3C, in block 160, the methodology gets the position of the haptic end effecter device 18 as previously described. The methodology then advances to block 162 and maps the position into CAD space as previously described. The methodology advances to block 164 and uses the position of the haptic end effecter device 18 to move the trajectory of the mechanism and CAD assembly of the digital model 24 as previously described. The methodology then advances to block 166 and updates the parameters of the haptic end effecter device 18 as previously described. The methodology advances to block 168 and commands force feedback, if needed, as previously described. The methodology advances to block 170 and updates the graphics of the digital model 24 on the display device 36 and head mounted display device 42 as previously described. The methodology advances to diamond 172 and determines whether the user 14 is signaling end of edit. Various types of signals are contemplated, including but not limited to, a switch integral with the haptic end effector device 18, a user interface menu or icon displayed on the display device 36, or orientation of the haptic end effector device 18. If the user 14 is not signaling the end of edit, the methodology advances to block 160 previously described. If the user 14 is signaling the end of edit, the methodology advances to bubble 174 and returns through block 158 in FIG. 3A to block 128 previously described.

Referring to FIG. 3A, in diamond 156, if the mode is not equal to edit, the methodology advances to diamond 176 and determines whether the mode is equal to evaluate. If the mode is not equal to evaluate the methodology advances to bubble 132 and exits. If the mode is equal to evaluate, the methodology advances to block 178 and executes or performs a subroutine called "evaluate mech" by passing through to block 180 in FIG. 3D. It should be appreciated that, when in the evaluate or play mode, the user 14 can evaluate the CAD assembly motion along the mechanism trajectory. It should also be appreciated that, if, for example, the user 14 is evaluating the mechanism motion, the application will move the CAD assembly associated with the mechanism in the graphic simulation to follow the hand motion of the user 14, and at the same time, it will apply the appropriate force feedback to constrain the hand 34 of the user 14 to follow the mechanism trajectory.

Figure 3D:
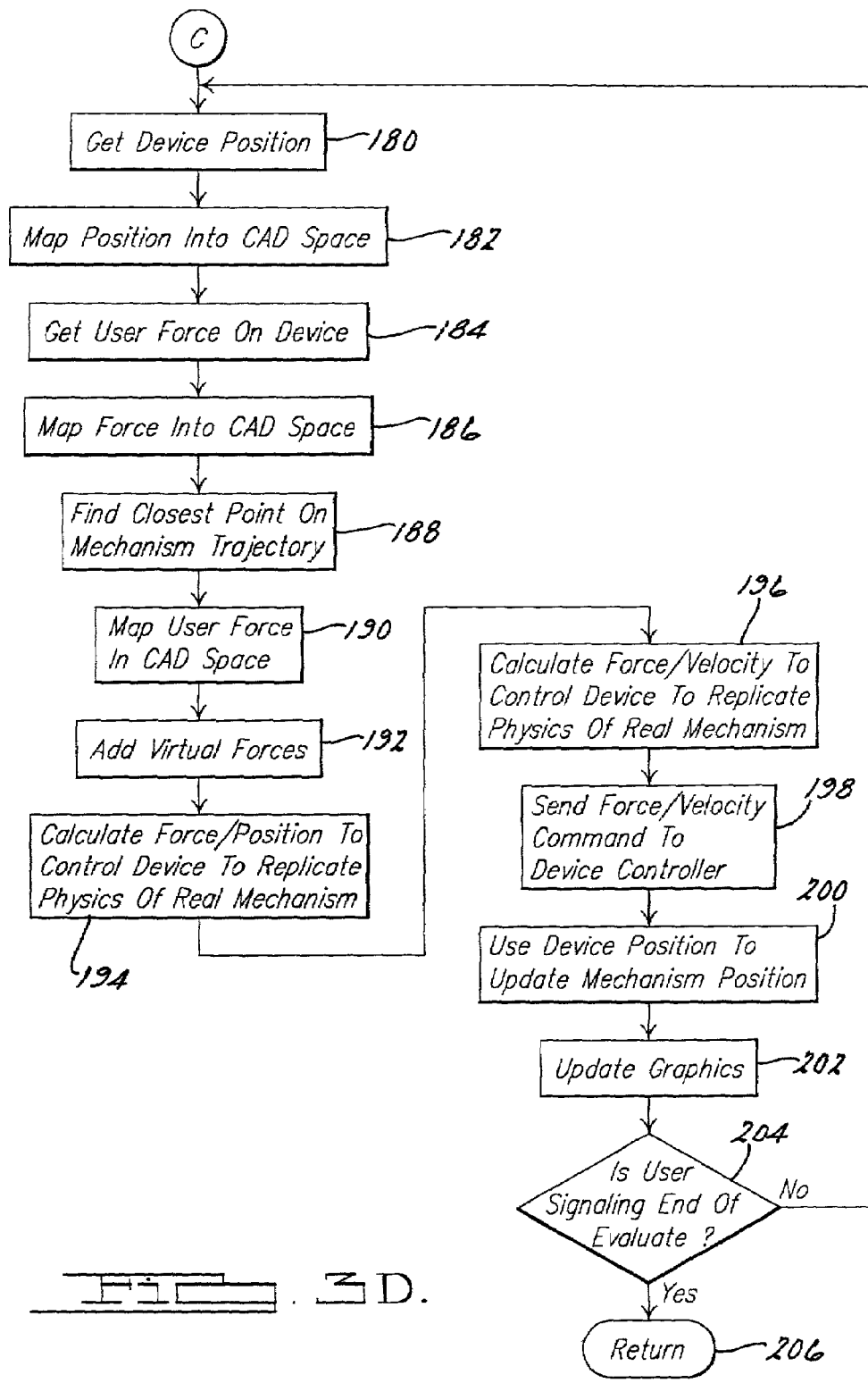

Referring to FIG. 3D, in block 180, the methodology gets the position of the haptic end effecter device 18 as previously described. The methodology then advances to block 182 and maps the position into CAD space as previously described. The methodology advances to block 184 and gets the force of the user 14 on the haptic end effecter device 18 as previously described. From block 184, the methodology advances to block 186 and maps the force into CAD space in the digital model 24.

From block 186, the methodology advances to block 188 and finds the closest point on the mechanism trajectory relative to the digital model 24 as previously described. The methodology then advances to block 190 and maps the user force into CAD space in the digital model 24. The methodology advances to block 192 and adds the virtual forces together.

The methodology advances to block 194 and calculates force/position to control the haptic end effecter device 18 to replicate physics of real mechanism. The methodology advances to block 196 and calculates force/velocity to control the haptic end effecter device 18 to replicate physics of real mechanism. The methodology advances to block 198 and sends force/velocity command to the controller for the haptic end effecter device 18.

After block 198, the methodology advances to block 200 and uses the position of the haptic end effecter device 18 to update the mechanism position. From block 200, the methodology advances to block 202 and updates the graphics of the digital model 24 on the display device 36 and head display device 42 as previously described. The methodology advances to diamond 204 and determines whether the user 14 is signaling end of evaluate. Various types of signals are contemplated, including but not limited to, a switch integral with the haptic end effector device 18, a user interface menu or icon displayed on the display device 36, a spherical button, or orientation of the haptic end effector device 18. If the user 14 is not signaling end of evaluate, the methodology advances to block 180 previously described. If the user 14 is signaling end of evaluate, the method advances to bubble 206 and returns through block 178 in FIG. 3A to block 128 previously described.

Figure 8:
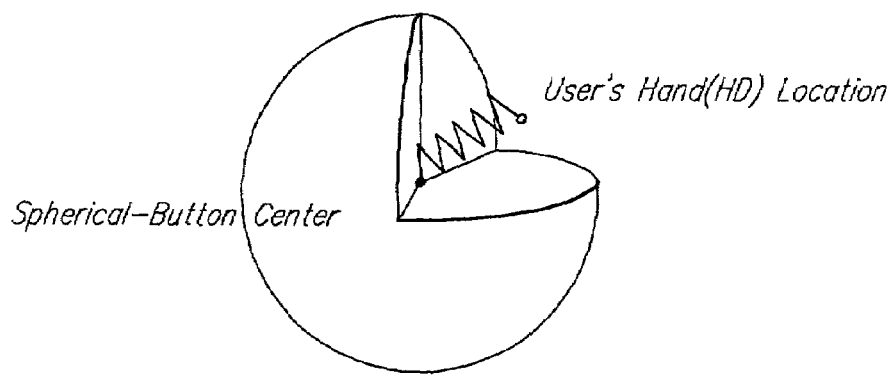
FIG. 8 is a diagrammatic view of a spherical button for a digital model using the system of FIG. 1.

In another embodiment, Control-Handles do not scale to account for a complex user interface where multiple actions with even more numerous variant can be taken. A Spherical-Button is the basic element of a more complex menu interface, the Web-Menu exactly like a click button is the basic element of a pop-up menu in Windows95. Its position can be fixed in space, such as around a Control-Handle or in a specific position on the desktop environment, or it could be invoked in real-time when the user 14 clicks a button on the haptic end effector device 18 in free space. Essentially a Spherical-Button is a sphere-like button that has to be clicked inside-out. Force-feedback is applied to pull the haptic end effector device 18 toward the center of the Spherical-Button as illustrated in FIG. 8.

The Spherical-Button is split into a user-defined number of equally sized sectors. A different action is associated with each sector. The set of action can be context dependent, or in other words, different action will be enabled depending on the past manipulation history. Different text messages may be used, one for each sector, to let the user 14 know the different actions he/she might perform. Text is highlighted, corresponding to the sector the haptic end effector device 18 is currently in. To click a Spherical-Button sector, the user 14 tries to pull away from the button from inside the desired sector. At the beginning, increasing force-feedback resists outward motion. Then, passed a threshold distance, the force decreases, signaling the user 14 that the button is now active. If the user moves back into the sphere, the Spherical-Button is clicked. If the user 14 moves instead the pointer further outside, force-feedback increases again, and then drops to zero. No action is taken and the Spherical-Button disappears.

In yet another embodiment, as soon as the user 14 passes the initial threshold, clicking can be performed by pressing the haptic end effector device 18 instead of returning to the center of the sphere. For example, in a simulation of a gear-stick of a vehicle, a Control-Handle is located at the tip of the stick. By default, this Control-Handle is used to rotate the stick around its axis. By clicking on a Spherical-Button around the Control-Handle, the user 14 can switch to a different mode, in which for example, he/she could move the entire gear-stick assembly to a new position, or to a mode in which to edit the range of motion.

In still another embodiment, a Web Menu architecture has multiple spherical buttons organized in a grid structure. Force-feedback Snap-On to the lines connecting different Spherical-Buttons making up the grid speeds up navigation from/to different spherical buttons. Each spherical button may also be expanded in child sub-spherical buttons, allowing for hierarchical organization of information.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system for virtual interactive design and evaluation and manipulation of vehicle mechanisms comprising:
   a computer system, wherein said computer system includes a memory, a processor, a user input device and a display device;
   a computer generated digital model of a vehicle mechanism stored in said memory of said computer system and having at least one control handle; and
   a haptic-user interface operated by a user that controls position, orientation, and force feedback between the user, said computer generated digital model, and said computer system, wherein said haptic interface includes a haptic end effector device being grasped by the user for transmitting information between a user and said digital model, wherein the user interactively creates, modifies, and evaluates kinematic and dynamic properties of the vehicle mechanism using said haptic end effector device and said at least one control handle.

2. A system as set forth in claim 1 including a virtual reality display mechanism operatively in communication with said computer system and said haptic-user interface so that the user can see said digital model in a virtual environment.

3. A system as set forth in claim 1 wherein said at least one control handle comprises a spherical button.

4. A method for virtual interactive design and evaluation and manipulation of vehicle mechanisms using a haptic-user interface, said method comprising the steps of:
  importing a digital model of a vehicle mechanism for evaluation using a haptic end effector device operatively connected to a haptic-user interface operated by a user that controls position, orientation, and force feedback between the user, the digital model, and a computer system;
  determining whether a user is signaling a mode change for the digital model;
  determining the mode change if the user is signaling a mode change of the digital model;
  getting a position of the haptic end effector device into a coordinate reference frame for the digital model if the user is not signaling a mode change of the digital model;
  determining whether a control handle on the digital model is close enough to the haptic end effector device;
  executing the mode change if the control handle is close enough;
  applying an attraction force to the control handle if the control handle is close enough;
  determining whether the user is terminating the session; and
  terminating the session if the user is terminating the session.

5. A method as set forth in claim 4 wherein said step of executing the mode change includes the steps of:
  determining a position of the haptic end effector device;
  mapping the position of the haptic end effector device;
  using the position of the haptic end effector device to move a mechanism trajectory relative to a CAD assembly of the digital model;
  updating parameters of the mechanism;
  updating graphics of the haptic-user interface; and
  determining whether the user is signaling end of the mode.

6. A method as set forth in claim 4 including the step of getting the position of the haptic end effecter device if the user is not signaling a mode change.

7. A method as set forth in claim 6 including the step of selecting a digital model of the vehicle mechanism from a database in the memory of the computer system prior to said step of getting the position of the haptic end effecter device, wherein the digital model is a computer-aided design model.

8. A method as set forth in claim 6 including the step of updating graphics prior to said step of determining whether the user is terminating the session.

9. A method as set forth in claim 4 including the step of determining whether the user is signaling intent to activate the control handle prior to said step of executing the mode change.

10. A method as set forth in claim 9 including the step of determining whether the mode change is one of create, edit, or evaluate if the user is signaling intent to activate the control handle.

11. A method as set forth in claim 4 including the step of setting the mode equal to evaluate prior to said step of determining whether the user is signaling a mode change.

12. A method as set forth in claim 11 including the step of determining whether the mode is equal to create if the user is signaling a mode change.

13. A method as set forth in claim 12 including the step of setting the mode to create if the mode is equal to create.

14. A method as set forth in claim 12 including the step of determining whether the mode is equal to edit if the mode is not equal to create.

15. A method as set forth in claim 14 including the step of setting the mode to evaluate if the mode is not equal to edit.

16. A method as set forth in claim 14 including the step of setting the mode to edit if the mode is equal to edit.

17. A method for virtual interactive design and evaluation and manipulation of a vehicle mechanism using a haptic-user interface, said method comprising the steps of:
  importing a digital model of a vehicle mechanism for evaluation using a haptic end effector device operatively connected to a haptic-user interface operated by a user that controls position, orientation, and force feedback between the user, the digital model, and a computer system;
  setting a mode equal to evaluate;
  determining whether the user is signaling a mode change for the digital model;
  changing the mode if the user is signaling a mode change of the digital model;
  getting a position of the haptic end effector device position into a coordinate reference frame for the digital model if the user is not signaling a mode change of the digital model;
  mapping the position of the haptic end effector device into CAD space of the digital model;
  finding the closest control handle on the digital model;
  determining whether the closest control handle on the digital model is close enough to the haptic end effector device;
  determining whether the user is signaling intent to activate the control handle if the closest control handle is close enough;
  determining the mode change and executing the mode change if the user is signaling intent to activate the control handle;
  applying an attraction force to the closest control handle if the closest control handle is close enough;
  updating graphics of the digital model;
  determining whether the user is terminating the session; and
  terminating the session if the user is terminating the session.

18. A method as set forth in claim 17 wherein said step of executing the mode change includes the steps of:
  determining a position of the haptic end effector device;
  mapping the position of the haptic end effector device;
  using the position of the haptic end effector device to move a vehicle mechanism trajectory relative to a CAD assembly of the digital model;
  updating parameters of the vehicle mechanism;
  updating graphics of the haptic-user interface; and
  determining whether the user is signaling end of the mode.

* * * * *